(12) United States Patent
Hancock et al.

(10) Patent No.: US 8,091,945 B2
(45) Date of Patent: Jan. 10, 2012

(54) VEHICLE SEATING SYSTEM

(75) Inventors: Robert L. Hancock, Lafayette, IN (US);
Robert P. Adams, Macomb, MI (US);
David F. Ekern, Knoxville, TN (US);
Ornela Zekavica, Novi, MI (US)

(73) Assignee: Johnson Controls Technology Company, Holland, MI (US)

(*) Notice: Subject to any disclaimer, the term of this patent is extended or adjusted under 35 U.S.C. 154(b) by 207 days.

(21) Appl. No.: 11/920,260

(22) PCT Filed: May 12, 2006

(86) PCT No.: PCT/US2006/018551
§ 371 (c)(1),
(2), (4) Date: Jun. 22, 2009

(87) PCT Pub. No.: WO2006/124674
PCT Pub. Date: Nov. 23, 2006

(65) Prior Publication Data
US 2009/0273211 A1   Nov. 5, 2009

Related U.S. Application Data

(60) Provisional application No. 60/680,597, filed on May 13, 2005.

(51) Int. Cl.
*B60N 2/14* (2006.01)
*A47C 3/18* (2006.01)

(52) U.S. Cl. .............. 296/65.06; 296/65.09; 297/13
(58) Field of Classification Search ............. 296/65.03, 296/65.06–65.09; 248/503.1; 297/344.22, 297/333, 13
See application file for complete search history.

(56) References Cited

U.S. PATENT DOCUMENTS

| | | | |
|---|---|---|---|
| 3,059,964 A * | 10/1962 | Hoppe et al. ................. 297/13 |
| 5,328,231 A | 7/1994 | Raymond et al. | |
| 5,707,103 A | 1/1998 | Balk et al. | |
| 5,803,546 A * | 9/1998 | Yamazaki ............. 297/333 |
| 6,065,804 A * | 5/2000 | Tanaka et al. .......... 297/336 |
| 6,231,103 B1 | 5/2001 | Elson et al. | |
| 6,877,811 B1 * | 4/2005 | Garelick ............. 297/344.22 |
| 6,883,854 B2 * | 4/2005 | Daniel ................. 296/65.03 |

* cited by examiner

*Primary Examiner* — Dennis Pedder
(74) *Attorney, Agent, or Firm* — Foley & Lardner LLP

(57) ABSTRACT

A vehicle seat assembly includes a seat frame having a seat back and stadium-type seat base for movement between a seating position and a storage position to improve ease of entry to the vehicle area behind the vehicle seat. The vehicle seat assembly includes a swing assembly coupled to the seat back and configured to rotate the folded seat assembly around a substantially vertical axis. A single handle operation is included for unlatching the seat latches—the seat base automatically flips up—and pivoting the entire vehicle seat toward the interior of the vehicle to allow easy entry behind the vehicle seat.

20 Claims, 11 Drawing Sheets

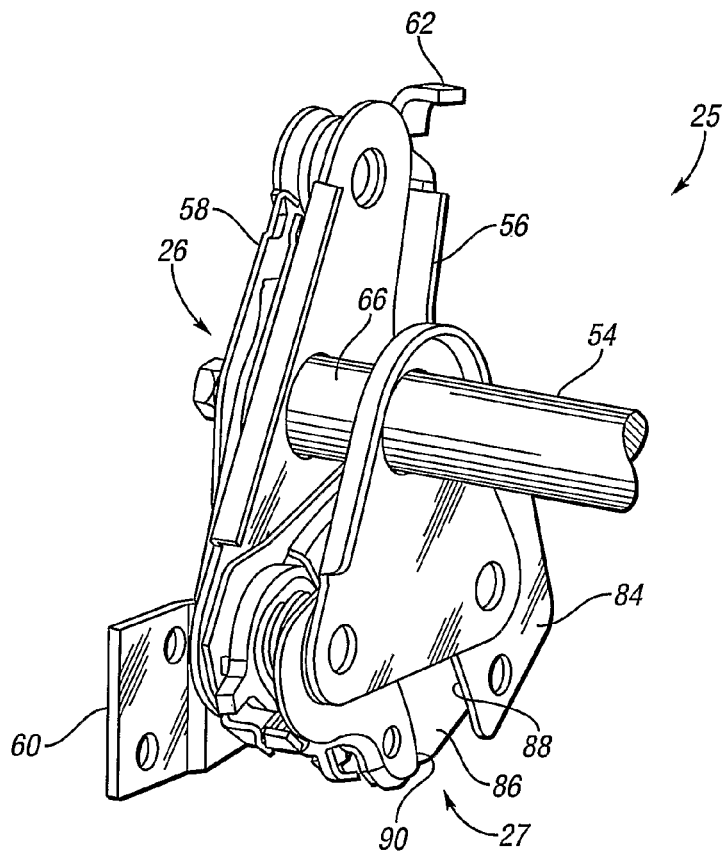
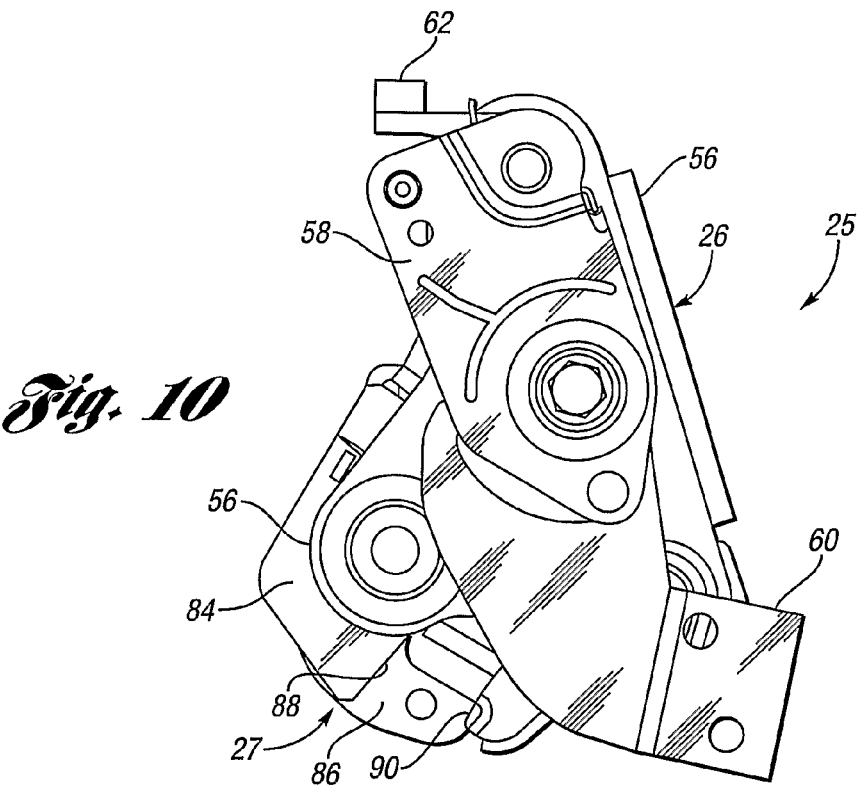

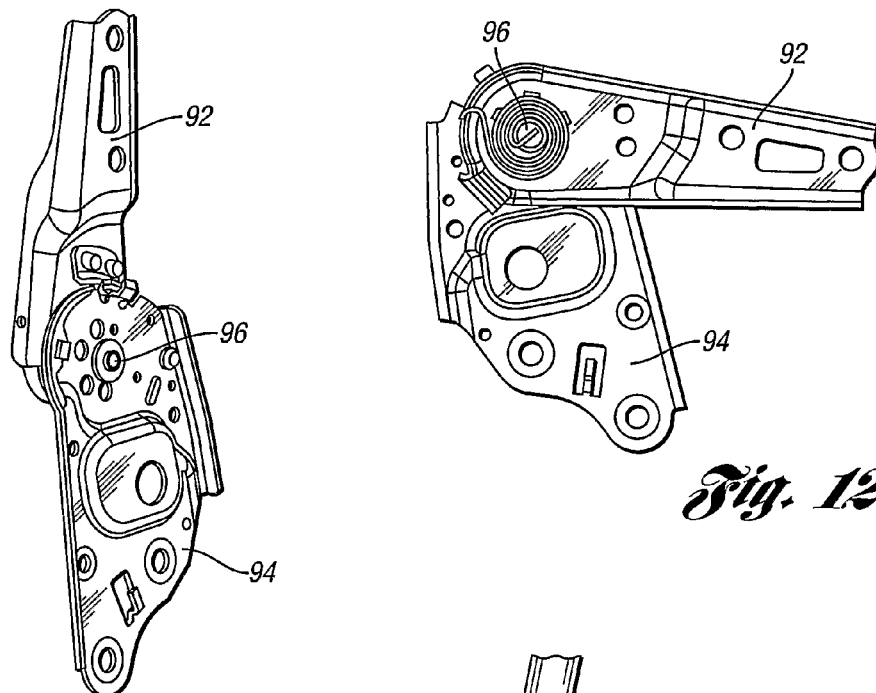
Fig. 12B
Fig. 12C
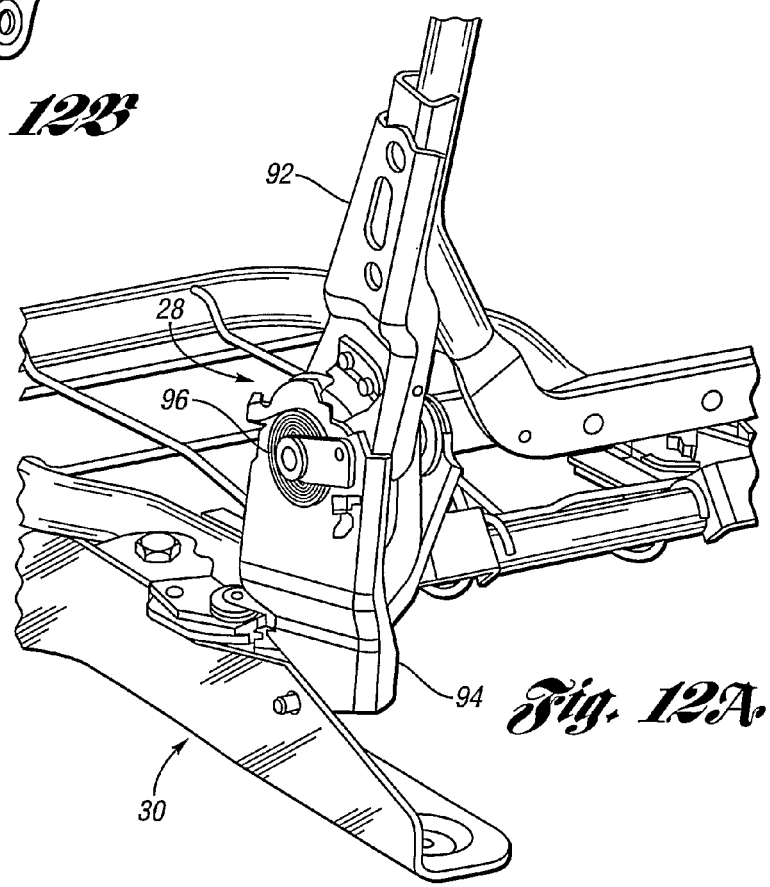
Fig. 12A

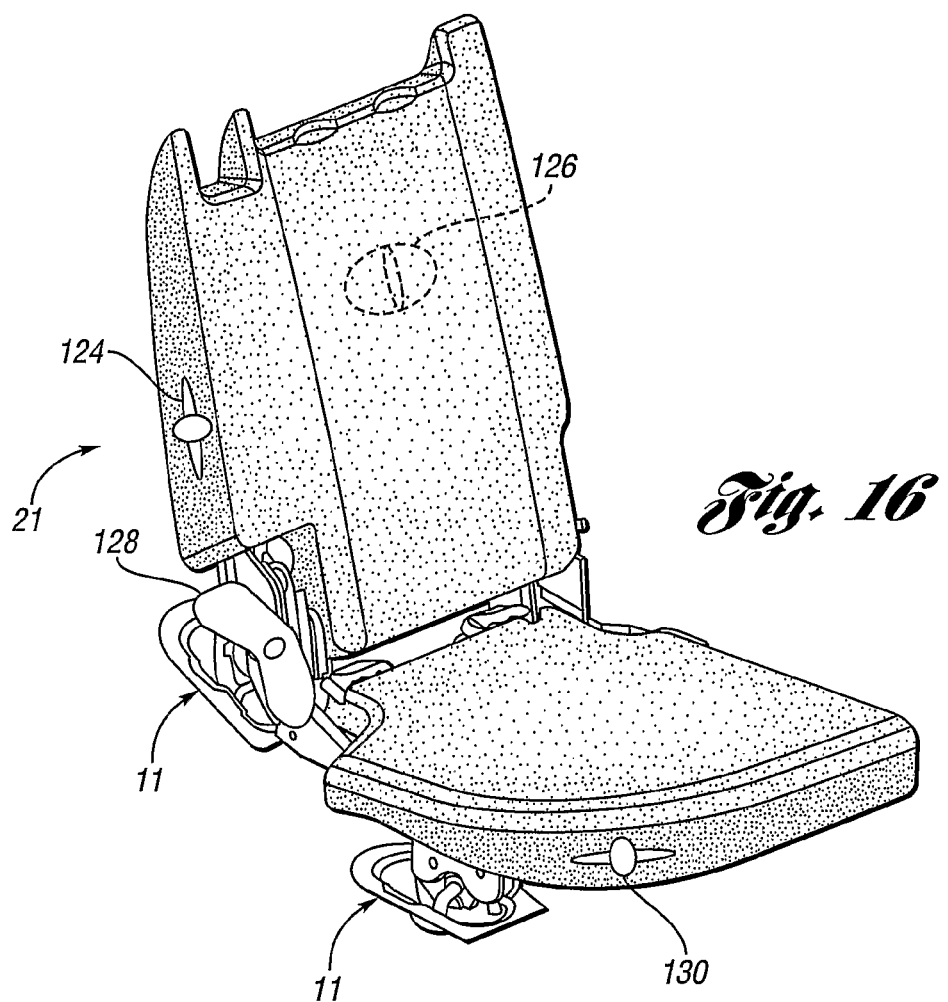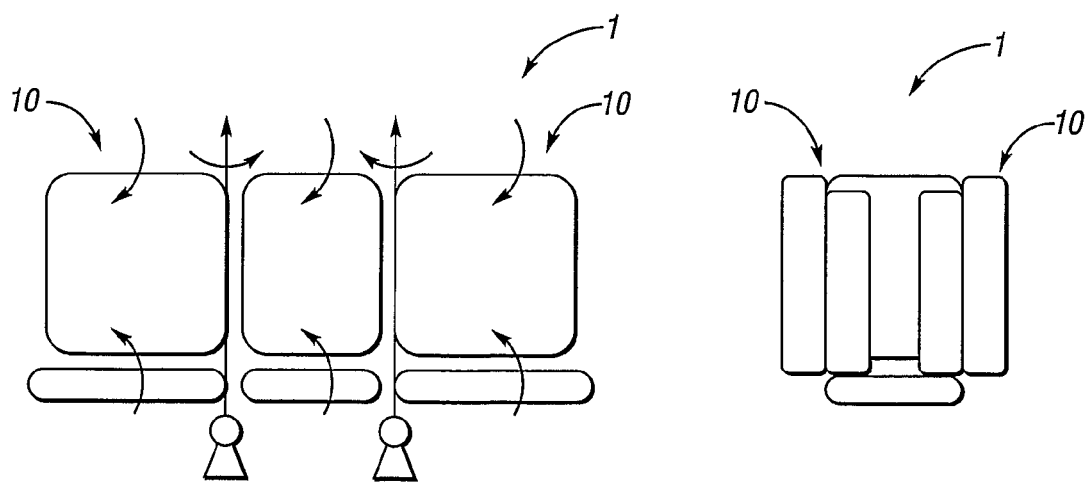

VEHICLE SEATING SYSTEM

BACKGROUND

The present invention relates generally to the field of adjustable seating. More specifically, the present invention relates to the field of adjustable seating configured to facilitate access to the interior of the vehicle in which the seating is located and to enhance the storage capabilities of the vehicle.

Many vehicles include at least two rows of seats. Often, these vehicles include a significant amount of cargo space behind the second row of seats. In some vehicles, such as CUVs, SUVs and minivans, a storage/cargo area or a third row of seats may be located behind the second row of seats. In order to access this cargo area, many vehicles provide a rear liftgate that allows a person to access the cargo area from the back of the vehicle. However, for people wanting to get to the third row of seats, the rear liftgate generally does not provide a convenient means to access those seats. Moreover, access to the third row of seats or cargo space may not be convenient from the rear doors of the vehicle. Essentially, the second row of seats becomes an obstacle to the cargo space or to the third row of seats.

To overcome this obstacle and facilitate entry to the rear cargo space or to the third row of seats, or to expand the cargo space, second row seats are provided in a variety of different configurations. For example, some seats are configured so that the seat back folds down on top of the seat cushion. Although this configuration allows cargo to be placed on top of the folded down seatback, it generally does not provide convenient access to a third row of seats because such a seat requires the occupant to climb over the folded down seat, which may be burdensome in many cases. Other seats are configured such that the seatback folds down over the seat cushion, and then the rear of the folded unit is rotated upward so that the seat cushion and seatback are in a generally vertical position proximate the back of the seat in front of the folded seat. While such a seat allows an occupant to more easily access the third row of seats, moving the seat from the seating position to the folded or storage position can be burdensome due to the fact that one must lift the weight of the seat to rotate it to the folded or vertical position. Moreover, because the seat back and seat cushion of such a seat are stored behind the front seat, the seat continues to intrude into the ingress/egress area behind the front seat (although not as much as before the seat was folded forward).

Other seats are configured so that the seat cushion folds forward and then the seatback folds down into the area the seat cushion occupied before it was folded forward. Although the height of the upper surface of the seatback is lower than it otherwise would be if the seat cushion were not folded forward, it is still elevated above the vehicle floor and serves as an obstacle that makes access to the third row of seats inconvenient.

Still other seats are configured so that the seat cushion can be rotated around the forward portion of the seat cushion into a generally vertical position proximate the back of the seat in front, and the seat back moved forward and upward (either at the same time the seat cushion is rotated forward, or after the seat cushion has been rotated forward) in a generally arc-like path until it rests proximate the seat cushion in a generally upright position. Although this configuration reduces the obstacles an occupant must climb over to reach the third row of seats, it still requires the occupant to lift the seatback while it is translated into the forward position. The need to lift the seat or a portion of the seat can be burdensome and inconvenient. Although various devices, such as spring and cable configurations, and semi-automatic or full automatic powered actuators, can be used to assist an occupant as he or she lifts a portion of the seat, these devices can be complicated and add unnecessary weight and cost. This seating configuration also stores the seat cushion and the seat back behind the front seat, which reduces the ingress/egress area by the thicknesses of the seat back and the seat cushion.

Other seats are configured in such a way that the backrest can be pivoted or rotated forward, and then the seat slid forward to provide access to the area behind the seat. Although the movement of these seats helps to improve access to the area behind the seat, the access is still relatively obstructed due to the limited extent to which the seat can normally be moved forward and out of the way.

Many conventional seats are configured to move between two positions or configurations, a seating or design position and a storage position. Often times, however, the storage position to which the seats are configured to move may be convenient for accommodating additional cargo, but not for providing access to a third row of seats or to the cargo area, or vice versa.

To provide a reliable, widely acceptable seating system or arrangement that better facilitates access to a rear cargo area or to an additional row of seating as well as the effective use of a cargo area, and which avoids one or more of the noted and other problems would represent a significant advance in the art.

SUMMARY

In one embodiment, the invention relates to a seating system or arrangement that includes a seat assembly for coupling to the floor of a vehicle. The seat assembly includes a backrest, a seat base or cushion, and a frame assembly that provides the supporting structure for the backrest and the seat base and that allows the seat assembly to assume different configurations. The frame assembly includes a rear cushion latch, a front cushion latch, a floor latch assembly, a reclining assembly, and a swing assembly. The rear cushion latch generally controls the movement of the seat base relative to the backrest. The front cushion latch generally assists the rear cushion latch in controlling the movement of the seat base relative to the backrest and couples the seat base to the vehicle. The floor latch assembly generally couples one side of the seat assembly to the vehicle and controls the rotation of the seat assembly about a substantially vertical axis. The reclining assembly controls the angular orientation of the backrest relative to the seat base. The swing assembly generally couples the other side of the seat assembly to the vehicle and facilitates the ability of the seat assembly to rotate around a substantially vertical axis.

The manner in which the different portions of the frame assembly are coupled to one another and to the vehicle allows the seat assembly to be moved between a first or design position, a second or cargo position, a third or stadium position, and a fourth or ingress/egress (I/E) position. In the design position, the seat assembly is configured to receive an occupant. In the cargo position, the backrest and corresponding portion of the frame assembly are rotated forward so that the front of the backrest is generally adjacent the seat base while the back of the backrest provides a generally horizontal surface upon which cargo may be placed. In the stadium position, the seat base and the corresponding portion of the frame assembly are rotated upward into a generally vertical position (where the rear edge of the seat base is positioned below a front edge of the seat base) and rest aligned with the backrest. In the I/E position, the seat base and the corresponding portion of the frame assembly is rotated upward to rest against the backrest (such that the rear edge of the seat base is positioned below the front edge of the seat base) and then the backrest, the seat base, and the corresponding portions of the frame assembly are pivoted approximately 90 degrees inward toward the center of the vehicle.

The present inventions further relate to various features and combinations of features shown and described in the disclosed embodiments. Other ways in which the objects and features of the disclosed embodiments are accomplished will be described in the following specification or will become apparent to those skilled in the art after they have read this specification.

BRIEF DESCRIPTION OF THE DRAWINGS

FIG. 9 is a perspective view of a portion of the frame assembly of FIG. 5 illustrating the rear cushion latch and the floor latch assembly from a different perspective.

FIG. 10 is a side view of a portion of the frame assembly of FIG. 5 illustrating the rear cushion latch and the floor latch assembly.

FIGS. 12A and 12B are perspective views of a reclining assembly of a seat system according to one embodiment of the present invention.

FIG. 12C is a side view of the reclining assembly of FIGS. 12A and 12B.

FIG. 16 is a perspective view of a seating system according to one embodiment of the present invention illustrating the actuation devices of the seating system.

FIG. 17A is a schematic illustration of two seat systems according to one embodiment of the present invention incorporated into a split seating arrangement of a vehicle showing the two seat systems in the design position.

FIG. 17B is a schematic illustration of the split seating arrangement of FIG. 17A showing the two seat systems in the ingress/egress position.

DETAILED DESCRIPTION OF THE EXEMPLARY AND ALTERNATIVE EMBODIMENTS

Before providing the description of the exemplary and alternative embodiments of the seat systems, it should be noted that any references to "outer," "inner," "intermediate," "above," "below," "upper," "lower," "left," "right," "front," "rear," "inboard," or "outboard" or other similar terms in this description are merely used to identify the various elements as they are oriented in the figures or as they may be oriented in one or more particular embodiments of the seat system. These terms are not meant to limit the element which they describe, as the various elements may be oriented or arranged differently in various seat systems.

Unless specifically noted otherwise, for purposes of this disclosure, the term "coupled" is intended to mean the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
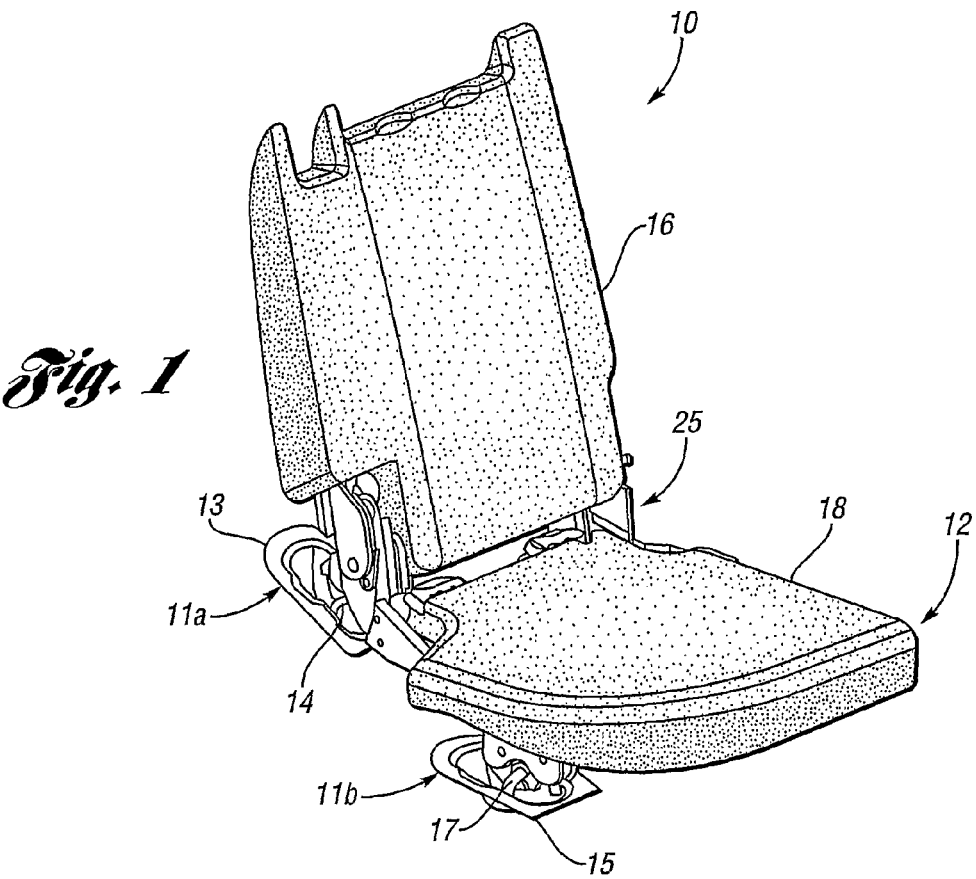
FIG. 1 is a perspective view of a seating system according to one embodiment of the present invention illustrated in a design position.
Figure 2:
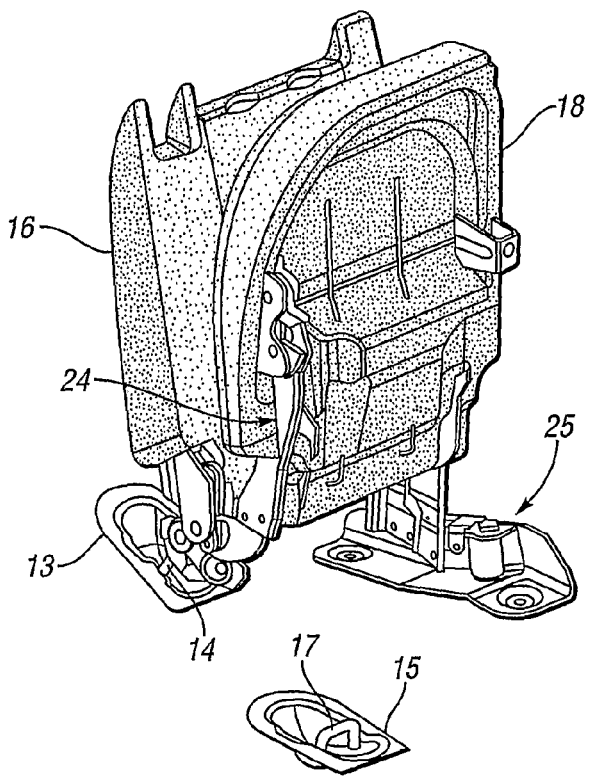
FIG. 2 is a perspective view of the seating system of FIG. 1 illustrated in a stadium position.
Figure 3:
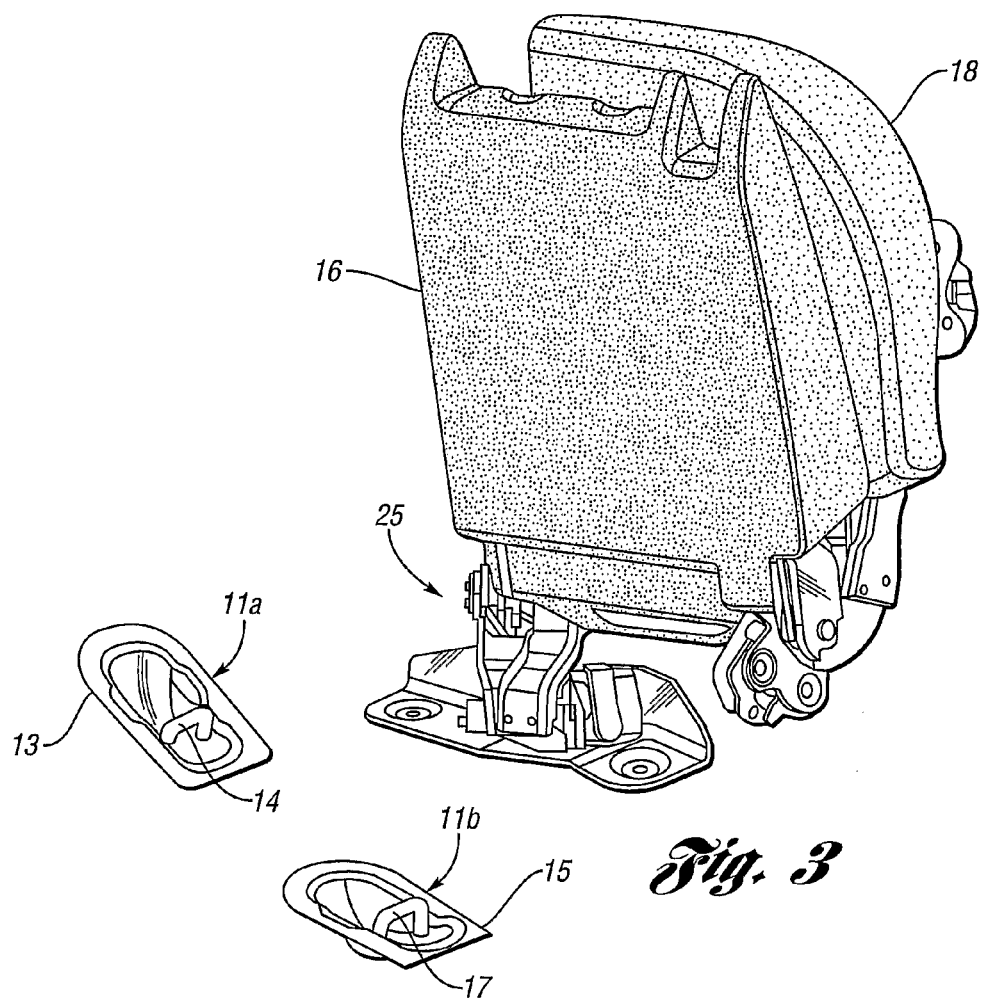
FIG. 3 is a perspective view of the seating system of FIG. 1 illustrated in an ingress/egress position.
Figure 4:
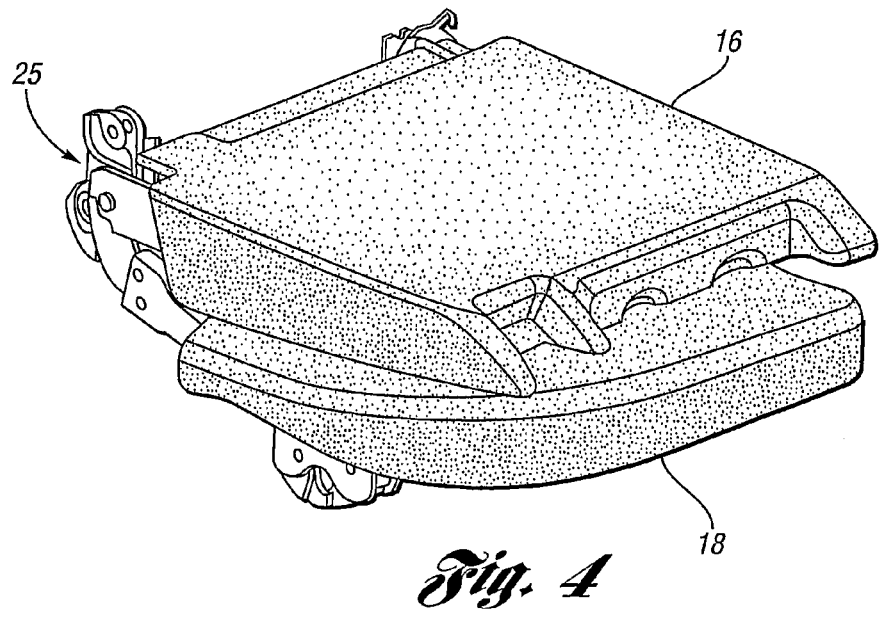
FIG. 4 is a perspective view of the seating system of FIG. 1 illustrated in a cargo position.

Referring to FIGS. 1-4, a seat system 10 is shown according to one exemplary embodiment. Seat system 10 includes a receiving system 11 that is incorporated into the floor of a vehicle and a seat assembly 12 configured to be coupled to the vehicle and to receiving system 11.

Figure 11A:
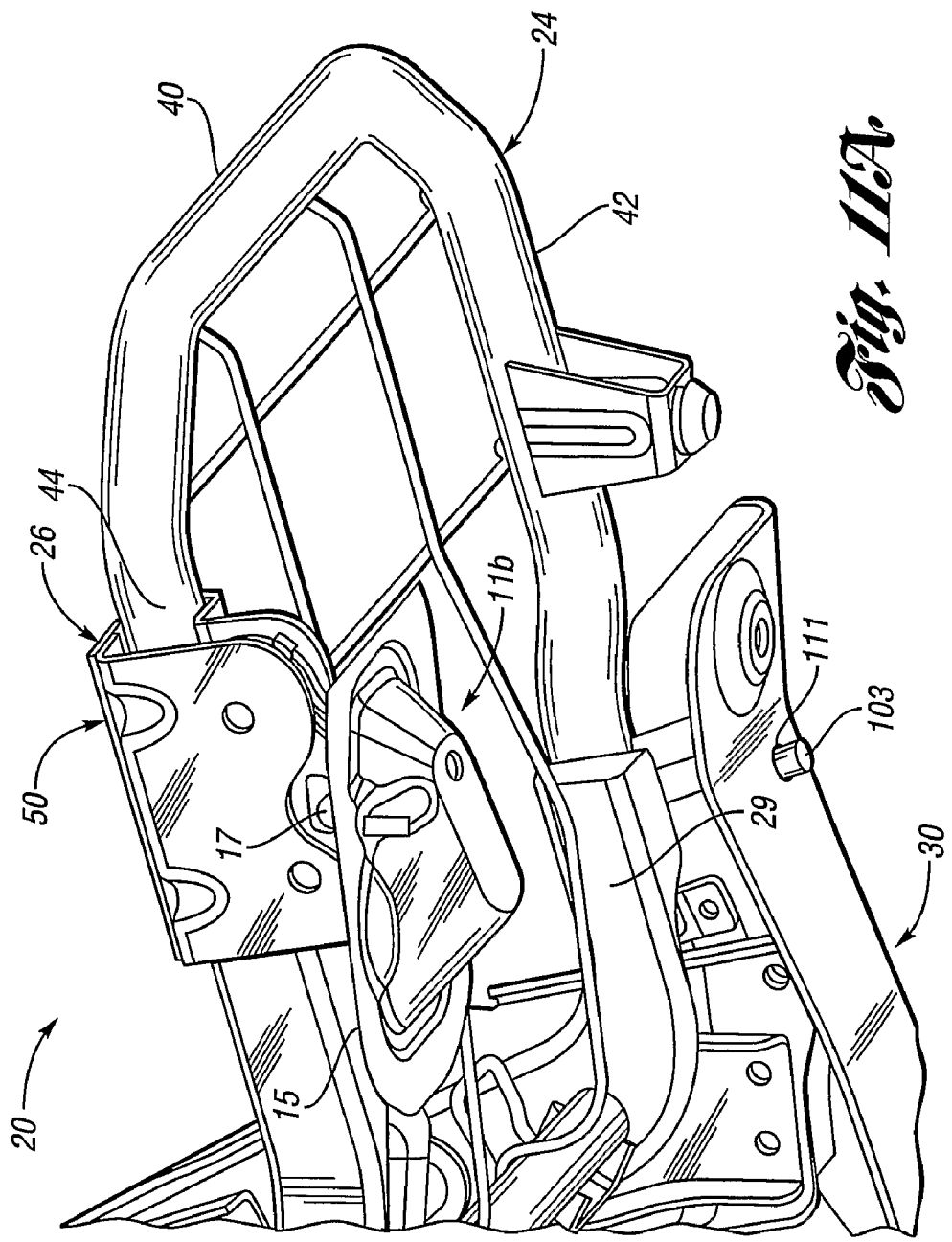
FIGS. 11A and 11B are bottom, perspective views of a portion of the frame assembly of FIG. 5 illustrating the front cushion latch and a portion of a receiving system.
Figure 11B:
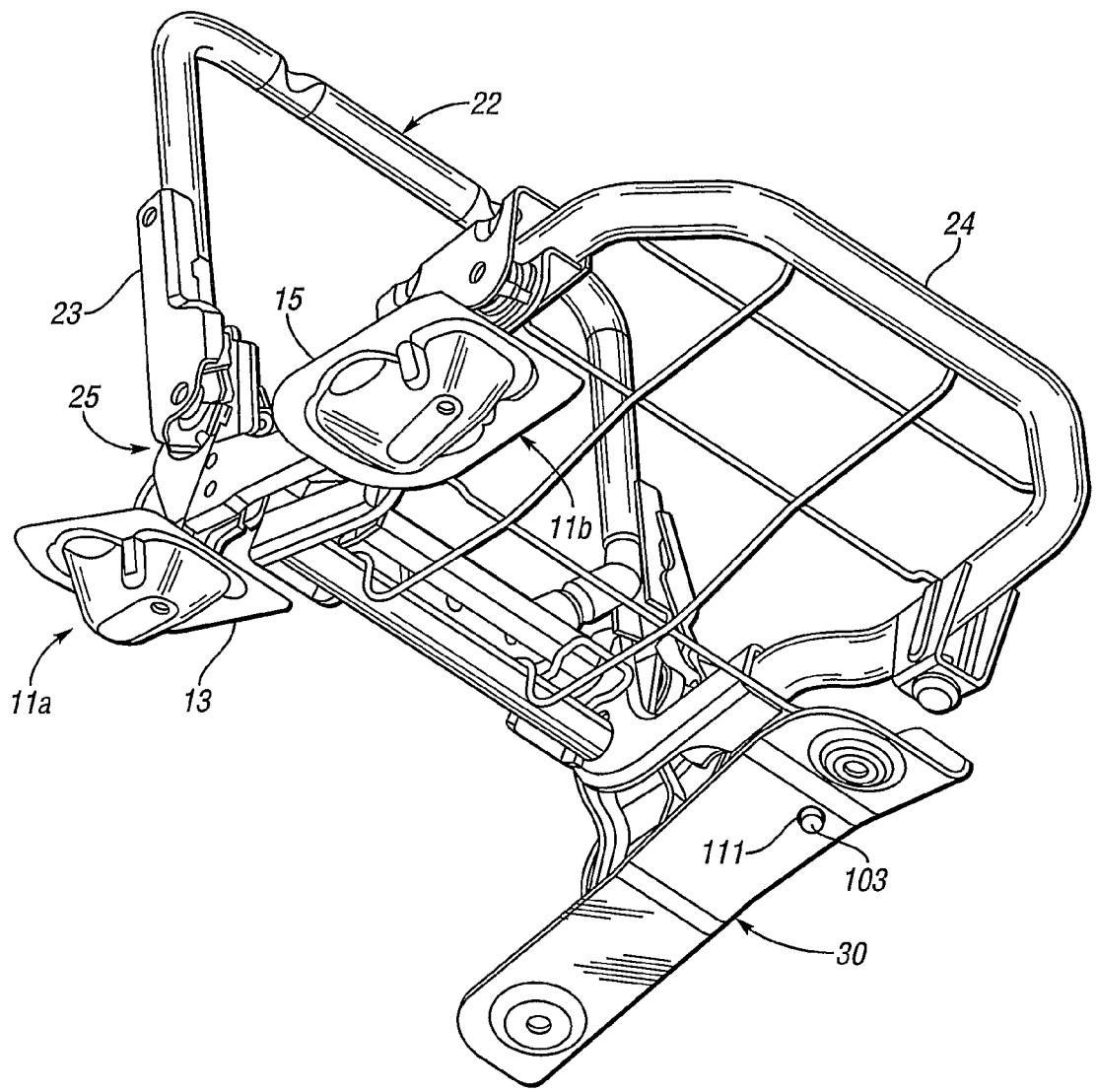

As best shown in FIGS. 1-4 and 11A-11B, receiving system 11 generally serves to facilitate the coupling of seat assembly 12 to the floor of the vehicle. According to one exemplary embodiment, receiving system 11 includes two inserts 11a and 11b that are fixedly secured to the floor of the vehicle. Insert 11a is generally located under the rear, outboard side of seat assembly 12 and receives a portion of a floor latch system (described below). Insert 11a includes a housing 13 that is secured to the vehicle floor and a support bar 14 that is rigidly secured to housing 13. Housing 13 includes a recess that allows the floor latch system to engage and substantially surround support 14. Insert 11b is generally located under the outboard side of seat assembly 12 near the front seat assembly 12 and receives a portion of a front cushion latch (described below). Like insert 11a, insert 11b includes a housing 15 that is secured to the vehicle floor and a support bar 17 that is rigidly secured to housing 15. Housing 15 includes a recess that allows the front cushion latch to engage and substantially surround support 17. According to various alternative and exemplary embodiments, the inserts may take one after variety of different shapes or configurations to cooperate with the floor latch system and the front cushion latch to releasably couple seat assembly 12 to the vehicle.

Figure 5:
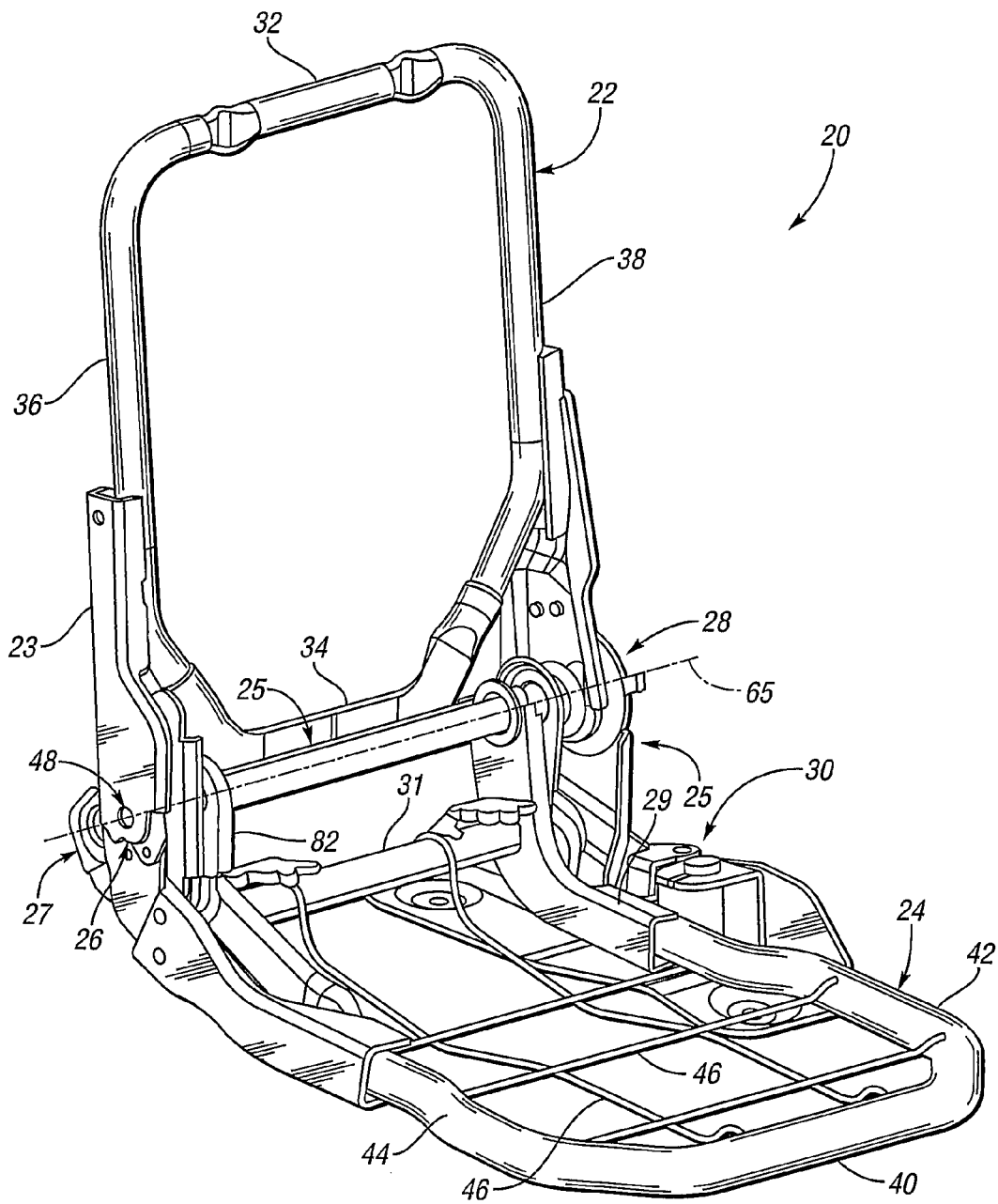
FIG. 5 is a front, perspective view of a frame assembly of a seat system according to one embodiment of the present invention.
Figure 6:
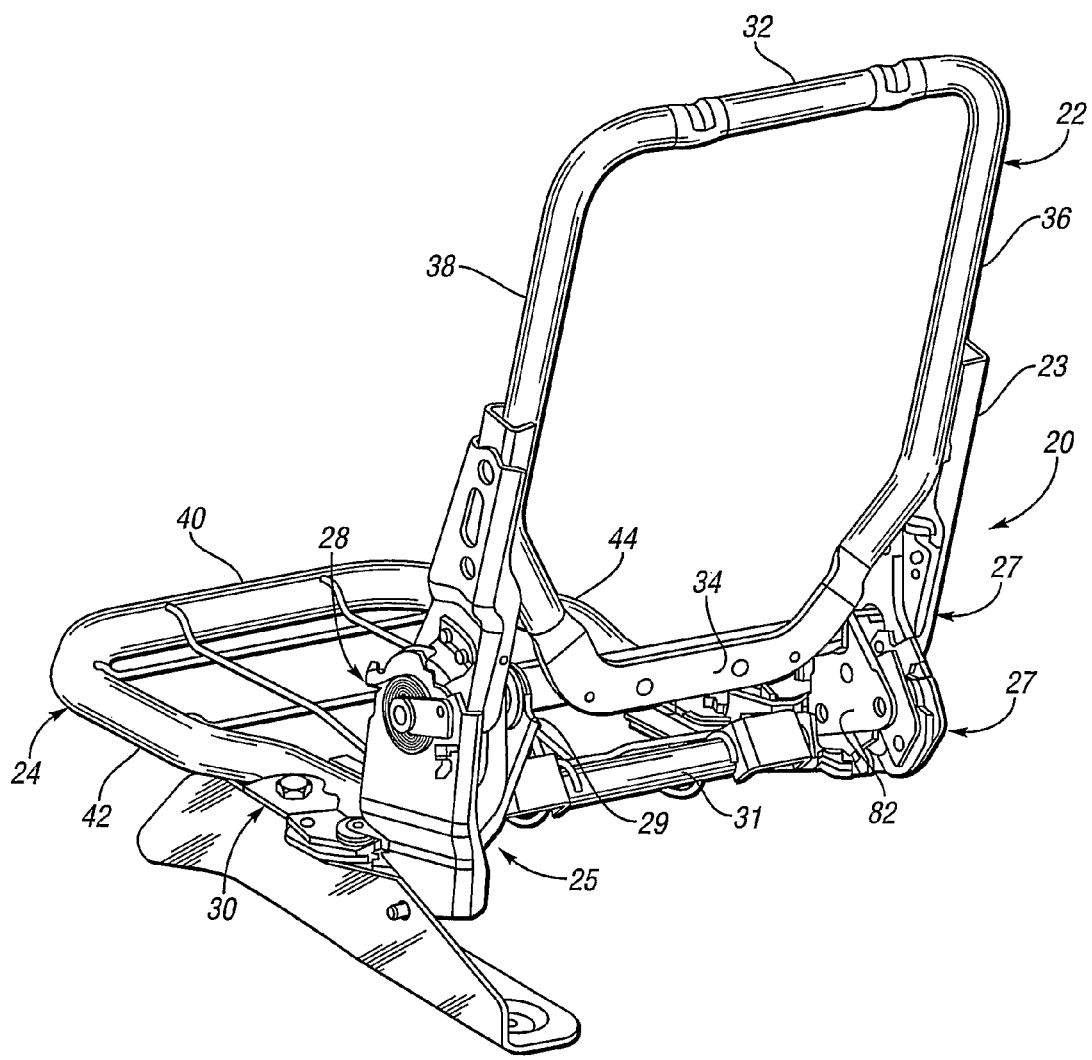
FIG. 6 is a rear, perspective view of the frame assembly of FIG. 5.

Referring now to FIGS. 1, 5, 6, 11A, 11B, and 16, seat 12 generally includes a backrest 16, a seat base 18, a frame assembly 20, and an actuation system 21. Backrest 16 and seat base 18 generally form the back and bottom, respectively, of seat 12 and individually may take one of a plurality conventional or novel configurations and arrangements. Generally, each of backrest 16 and seat base 18 includes a cushioning material, such as foam, that is covered by suitable covering material (such as cloth, vinyl, or leather) and supported by frame assembly 20. According to various alternative and exemplary embodiments, the shape and configuration of backrest 16 and seat base 18 may vary depending on the particular application in which seat 12 is used.

Frame assembly 20 generally provides the structure to support the cushioning material and covering material of backrest 16 and seat base 18 as well as structure and mechanisms that control and facilitate the movement of seat 12 between its different positions. According to one exemplary embodiment, frame assembly 20 includes a backrest frame 22, a seat base frame 24, and a linking system 25.

Backrest frame 22 generally provides the structure that supports the cushion material and covering material of backrest 16. According to one exemplary embodiment, backrest frame 22 is constructed from a rigid tubular member that is formed into a generally rectangular shape that forms the general shape of backrest 16. Back frame 22 includes a generally horizontal upper segment 32, a generally horizontal lower segment 34, a generally vertical outboard segment 36 extending between the outboard ends of upper segment 32 and lower segment 34, and a generally vertical inboard segment 38 extending between the inboard ends of upper segment 32 and lower segment 34. The length of lower segment 34 is less than that of upper segment 32, and the lower ends of outboard segment 36 and inboard segment 38 angle inwardly (or towards the center of backrest 16) to intersect the ends of lower segment 34. Backrest frame 22 may also include wires (not shown) that extend between upper segment 32, lower segment 34, outboard segment 36, and inboard segment 38 (e.g., horizontally and vertically) to provide a resilient support structure for the center portions of backrest 16. According to various alternative and exemplary embodiments, the center portions of backrest 16 may be supported by a resilient mat or by one of a variety of other types of materials that extend between the different segments of frame 22.

Seat base frame 24 generally provides the structure that supports the cushion material and covering material of seat base 18. According to one exemplary embodiment, seat base frame 24 is constructed from a rigid tubular member that is formed into a U-shaped frame that forms the general shape of seat base 18. Seat base frame 24 includes a generally horizontal and laterally extending front segment 40, a generally horizontal and longitudinally extending inboard segment 42 that extends rearward from one end of front segment 40, and a generally horizontal and longitudinally extending outboard segment 44 that extends rearward from the other end of front segment 40. Seat base frame 24 may also include wires 46 that extend between front segment 40, inboard segment 42, and outboard segment 44, (e.g., in lateral and longitudinal directions) to provide a resilient support structure for the center portions of seat base 18. According to various alternative and exemplary embodiments, the center portions of seat base 18 may be supported by a resilient mat or by one of a variety of other types of materials that extend between the different segments of frame 24. Seat base frame 24 also includes a bar 31 that extends between inboard segment 42 and outboard segment 44 and that includes a ISOFIX LATCH system.

Linking system 25 is a system of components that link backrest frame 22 and seat base frame 24 together and that serve to control the movement of backrest frame 22 and seat base frame 24 relative to one another and to linking system 25. Although linking system 25 links backrest frame 22 and seat base frame 24, it generally allows backrest frame 22 and seat base frame 24 to move or pivot independently of one another. Linking system 25 also allows backrest frame 22 and seat base frame 24 to move or pivot relative to one another around the same axis. According to one exemplary embodiment, linking system 25 includes a torsion bar 54, a cushion latch system 26, a floor latch assembly 27, a reclining assembly 28, and a swing assembly 30.

Torsion bar 54 (e.g., tube, pivot tube, pivot, shaft, hinge pin, etc.) is a substantially rigid, tube-like member that forms an axis of rotation 65 that is shared by backrest 16 and seat base 18. Torsion bar 54 extends generally across the width of seat assembly 12, with an inboard end 64 of torsion bar 54 coupled to a portion of reclining assembly 28 and an outboard end 66 coupled to a portion of rear cushion latch 48 and to a portion of floor latch assembly 27. To assist in the coupling of torsion bar 54 to reclining assembly 28, inboard end 64 is generally flanged out or expanded to form a hex head 68. Backrest frame 22 is coupled to torsion bar 54 on the outboard side by a bracket 23 that is fixedly coupled on one end to outboard segment 36 and freely, rotatably coupled to torsion bar 54 on the other end. The inboard side of backrest frame 22 is indirectly coupled to torsion bar 54 through reclining assembly 28. Accordingly, reclining assembly 28 controls the manner in which backrest frame 22 is able to pivot or rotate around torsion bar 54. Seat base frame 24 is coupled to torsion bar 54 on the inboard side by a generally L-shaped bracket 29 that is fixedly coupled on one end to inboard segment 42 and freely, rotatably coupled to torsion bar 54 on the other end. The outboard side of seat base frame 24 is indirectly coupled to torsion bar 54 through rear cushion latch 48. Accordingly, rear cushion latch 48 controls the manner in which seat base frame 24 is able to pivot or rotate around torsion bar 54.

Figure 7:
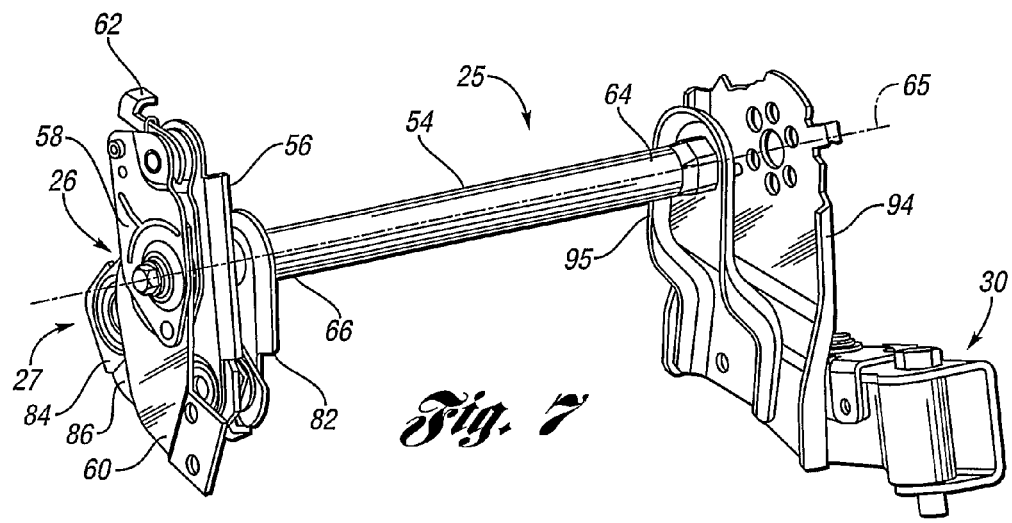
FIG. 7 is a perspective view of a portion of the frame assembly of FIG. 5 illustrating a rear cushion latch, a floor latch assembly, and a swing assembly.
Figure 8:
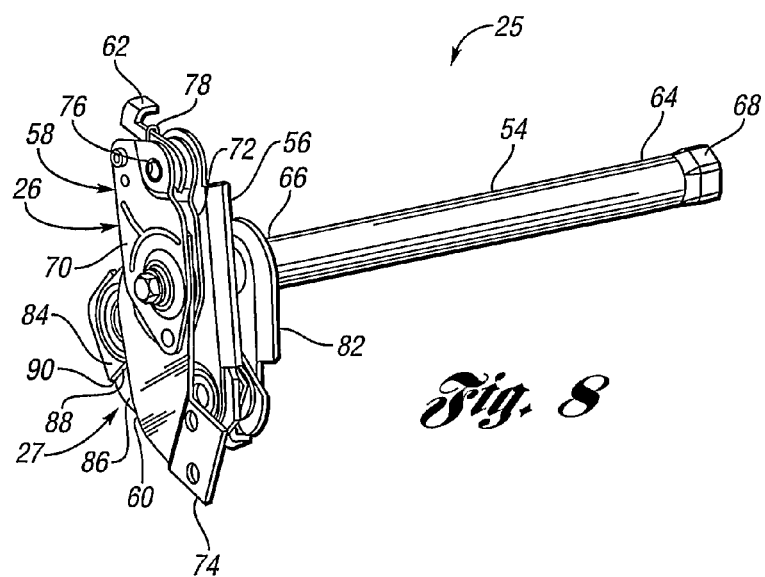
FIG. 8 is a perspective view of a portion of the frame assembly of FIG. 5 illustrating the rear cushion latch and the floor latch assembly.

Referring now to FIGS. 5-11B, cushion latch system 26 is a system of components that generally controls whether seat base 18 may be pivoted or rotated with respect to torsion bar 54. According to one exemplary embodiment, cushion latch system 26 includes a rear cushion latch 48 and a front cushion latch 50.

According to one exemplary embodiment, rear cushion latch 48 is disposed between outboard segment 44 of seat base frame 24 and torsion bar 54 and generally serves as the outboard pivot point of seat base 18. Rear cushion latch 48 is selectively adjustable between a substantially locked state in which the angular orientation of seat base 18 is substantially locked with respect to torsion bar 54, and an unlocked state in which seat base 18 may pivot or rotate relative to torsion bar 54. According to one exemplary embodiment, rear cushion latch 48 includes a bracket 56, a latching apparatus 58, an arm 60, and a release mechanism 62.

Bracket 56 (e.g., support, brace, etc.) is a generally rigid structure that is fixedly coupled to torsion bar 54 proximate outboard end 66 and that generally serves to support latching apparatus 58 as well as a portion of floor latch system 27.

Latching apparatus 58 (e.g., lock, latch, retainer, etc.) is a device that releasably retains arm 60 in a particular position (e.g., the design or Stadium position) until release mechanism 62 is actuated, after which latching apparatus 58 allows arm 62 rotate about axis 65. Latching apparatus 58 generally includes an outer plate 70 and an inner plate 72 that are spaced apart in generally parallel to one another. Arm 60 and release mechanism 62 are coupled between outer plate 70 and inner plate 72 in a manner that allows release mechanism 62 and arm 60 to pivot within the gap or space between outer plate 70 and inner plate 72.

Arm 60 (e.g., leg, pivot arm, etc.) is a substantially rigid member that serves to couple seat base frame 24 to rear cushion latch 48 in a manner that allows seat base frame 24 to be releasably retained in a design or stadium position and to be rotated around pivot axis 65 into the other of the two positions. Arm 60 is coupled to torsion bar 54 and is located between outer plate 70 and inner plate 72 such that outer plate 70 and inner plate 72 substantially prevent arm 60 from moving longitudinally along torsion bar 54, but permit arm 60 to pivot or rotate around torsion bar 54 (axis 65) within the gap formed between outer plate 70 and inner plate 72. Arm 60 includes a distal end 74 that is configured to be coupled to outboard segment 44 of seat base frame 24, such as through the use of one or more various fasteners or other methods or devices.

Release mechanism 62 (e.g., release, latch, trigger, switch, etc.) is a device that releases arm 60 from a locked position. Release mechanism 62 is coupled between outer plate 70 and inner plate 72 of latching apparatus 58 and is configured to at least partially rotate about a pin 76 that extends perpendicularly between outer plate 70 and inner plate 72. Release mechanism 62 generally includes an engagement apparatus such that when release mechanism 62 is rotated around pin 76, release mechanism 62 releases the lock that prevents arm 20 from pivoting around axis 65. According to one exemplary embodiment, a biasing device shown as a spring 78 may be provided to bias release mechanism 62 into a position that maintains arm 20 in a locked condition.

According to various alternatives and exemplary embodiments, rear cushion latch 48 may include a biasing device that biases seat base 18 toward the stadium position. A damper may be provided for use in connection with the biasing device so that seat base 18 pivots into the stadium position in a smooth and controlled manner. According to other various alternative and exemplary embodiments, the biasing device and/or damper may not be provided as part of the rear cushion latch, but rather may be provided as part of seat base frame 24, the linking system 25, and/or other components of the seat assembly.

Front cushion latch 50 (e.g., catch, release, etc.) is a device configured to releasably couple to support 17 of receiving system 11 provided in the floor of the vehicle. According to one exemplary embodiment, front cushion latch 50 is fixedly coupled to a portion of outboard segment 44 of seat base frame 24 near where outboard segment 44 intersects front segment 40. At this location, front cushion latch 50 is spaced apart from pivot axis 65 and generally assists rear cushion latch 48 in retaining seat base 18 in the design position. Front cushion latch 50 also serves to substantially secure seat base frame 24 to the floor of the vehicle (e.g., to receiving system 11) to assist with the transfer of loads to the vehicle in the event of an accident. Front cushion latch 50 generally includes a first member defining a channel configured to receive support 17 of receiving system 11 and a second member that moves relative to the first member. The second member is configured to move between a first position in which support 17 is capable of entering (or exiting) the channel and a second position in which support 17 is locked within (or out of) the channel. According to various alternative and exemplary embodiments, the front cushion latch may take one of a variety of different configurations that are suitable to releasably couple seat base frame 24 to the floor of the vehicle.

Referring now to FIGS. 6-10, floor latch assembly 27 is an assembly of components that cooperate to releasably engage a support 14 of receiving system 11 to releasably retain torsion bar 54 in the generally lateral position the torsion bar 54 assumes when seat 12 is in the design position. When floor latch assembly 27 is disengaged from receiving system 11, torsion bar 54 (and therefore backrest 16 and seat base 18) is permitted to rotate around swing assembly 30 (described below). Floor latch assembly 27 is fixedly coupled to torsion bar 54 proximate the outboard end 66 of torsion bar 54. According to one exemplary embodiment, floor latch assembly 27 includes a support bracket 82, a body 84, and a latch 86.

Support bracket 82 (e.g., support plate, panel, etc.) is a rigid panel that is fixedly coupled to outboard end 66 of torsion bar 54 on the inboard side of bracket 56 of cushion latch assembly 26. Support bracket 82 is configured to support body 84 and is spaced apart from bracket 56 by a distance that allows body 84 to be located between support bracket 82 and bracket 56. Body 84 is disposed between support bracket 82 and bracket 56 and is coupled to both support bracket 82 and bracket 56.

Body 84 (e.g., member, structure, device, etc.) is a rigid member having a channel 88 that is configured to receive support 14 of receiving system 11. Channel 88 includes an opening 90 through which support 14 enters channel 88.

Latch 86 (e.g., lever, door, slider, etc.) is a generally rigid member that is coupled to body 84 in a way that allows it to rotate or pivot between an open position in which latch 86 is not covering opening 90 of channel 88 and a closed position in which latch 86 is covering opening 90. According to one exemplary embodiment, a biasing device, such as a torsion spring (not shown), is coupled to latch 86 to bias latch 86 toward the closed position. When latch 86 is moved to the open position, support 14 is free to enter or exit channel 88. However, when latch 86 is allowed to move to the closed position while support 14 is within channel 88, latch 86 prevents support 14 from exiting channel 88. According to one exemplary embodiment, body 84 and latch 86 are shaped and designed to substantially surround the corresponding portion of receiving system 11 so that any movement or play between floor latch assembly 27 (or seat assembly 12) and support 14 is minimized. This helps to minimize any rattles and provides a generally tight connection between seat assembly 12 and the floor the vehicle.

According to various alternative and exemplary embodiments, the floor latch assembly may take one of a variety of different configurations that are suitable to releasably couple torsion bar 54 to the floor of the vehicle.

Referring now to FIGS. 6, 7, and 12A-12C, reclining assembly 28 is an assembly of components that cooperate together to control, and allow for the adjustment of, the reclining angle of backrest 16. According to one exemplary embodiment, reclining assembly 28 includes an inner plate 92, an outer plate 94, a secondary outer plate 95 and a reclining mechanism 96. Inner plate 92 is a generally rigid structure that couples reclining mechanism 96 to inboard segment 38 of backrest frame 22. Outer plate 94 is a generally rigid structure that couples reclining mechanism 96 to swing assembly 30. Secondary outer plate 95 is fixedly coupled to outer plate 94 and extends inwardly to receive torsion bar 54. The coupling of torsion bar 54 to secondary outer plate 95 rather than directly to outer plate 94 allows outer plate 94 to be coupled to torsion bar 54 (albeit indirectly) while at the same time providing a space that facilitates the coupling of inner plate 92 and reclining mechanism 96 to outer plate 95. Reclining mechanism 96 is coupled between inner plate 92 and outer plate 94 and generally controls the manner in which inner plate 92 is permitted to rotate relative to outer plate 94. According to one exemplary embodiment, reclining assembly 28 is configured to allow the reclining angle of backrest 16 to be selectively adjusted to between 5 and 45 degrees relative to a vertical axis, and more preferably to between 10 and 35 degrees relative to a vertical axis. In addition to allowing for the adjustment of the reclining angle of backrest 16, reclining assembly 28 is also configured to permit backrest 16 to rotate forward into the cargo position in which the front of backrest 16 is facing downward (and is located proximate the top of seat base 18) and the back of backrest 16 is facing upward. According to various alternative and exemplary embodiments, the reclining assembly may be configured to permit only one of the adjustment of the reclining angle of backrest 16 and the pivoting of backrest 16 forward into the cargo position. According to other various alternative and exemplary embodiments, the reclining assembly may include a biasing device that causes the reclining assembly to bias the backrest toward the cargo position.

Figure 13:
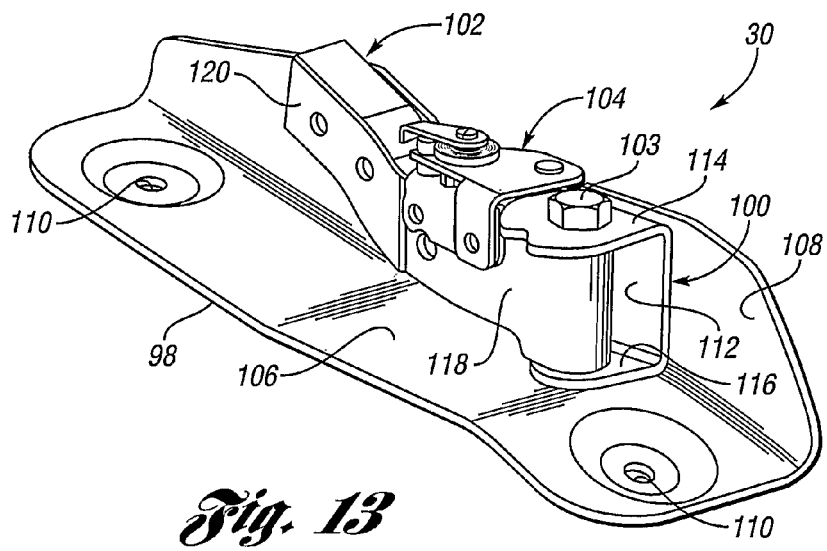
FIG. 13 is a perspective view of a swing assembly of a seat system according to one embodiment of the present invention.
Figure 14:
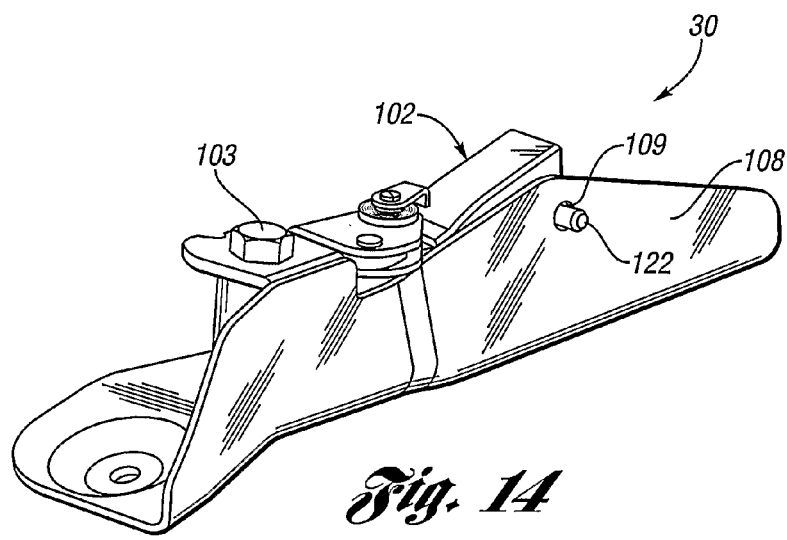
FIG. 14 is a perspective view of the swing assembly of FIG. 13 taken from an opposite side of the swing assembly.
Figure 15:
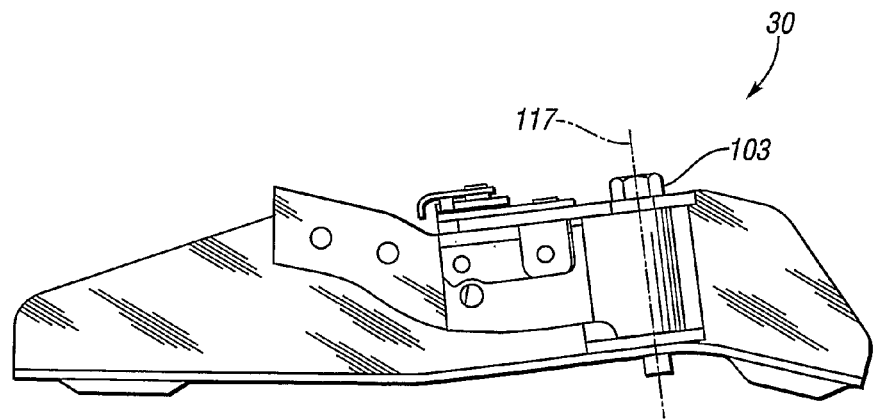
FIG. 15 is a side view of the swing assembly of FIG. 13.

Referring now to FIGS. 5, 11A-11B, and 13-15, swing assembly 30 is an assembly of components that permits backrest 16 and seat base 18 (along with the corresponding portions of frame assembly 20) to be pivoted or rotated inwardly so that the area previously occupied by backrest 16 and seat base 18 is available for an occupant to pass through (such as when trying to access or depart from a more rearward set of seats) or for storage. According to one exemplary embodiment, swing assembly 30 includes a floor mounting bracket 98, an attachment bracket 100, a swing arm 102, a pivot pin 103, and optionally, a locking assembly 104.

Floor mounting bracket 98 (e.g., support, floor support, brace, flange, etc.) is a rigid, elongated, and generally L-shaped member having a horizontal leg 106 and a vertical leg 108. Horizontal leg 106 is configured to be coupled to the floor the vehicle and may have a contour that corresponds to the contour of the portion of the vehicle floor to which it will be coupled. Horizontal leg 106 includes two apertures 110 that are configured to receive fasteners (e.g. bolts, screws, rivets, etc.) to couple floor mounting bracket 98 to the floor of the vehicle. Horizontal leg 106 also includes an aperture 111 that is configured to receive a portion of pivot pin 103. Vertical leg 108 extends generally upwardly from the inboard edge of horizontal leg 106 and provides support for attachment bracket 100. Vertical leg 108 includes an aperture 109 that receives a portion of swing arm 102 when swing arm 102 is in the design position to provide additional support for swing arm 102.

Attachment bracket 100 (e.g. brace, flange, support, etc.) is a rigid, generally C-shaped member that serves to support and maintain the orientation of pivot pin 103 and therefore swing arm 102. According to one exemplary embodiment, attachment bracket includes a generally upstanding base 112 that is coupled to vertical leg 108 of floor mounting bracket 98, an upper leg 114 that extends generally perpendicularly from the upper end of base 112, and a lower leg 116 that extends generally perpendicularly from the lower end of base 112 proximate horizontal leg 106 of floor mounting bracket 98. Upper leg 114, lower leg 116, and horizontal leg 106 (of floor mounting bracket 98) include coaxial apertures 113*a*, 113*b*, and 113*c*, respectively, (not shown) that are aligned to form an axis 117. Each of the aligned or coaxial apertures 113*a*, 113*b*, and 113*c* are configured to receive, support, and orient pivot pin 103, which provides the pivot structure about which swing arm 102 pivots.

Swing arm 102 (pivot arm, hinge, etc.) is an elongated, rigid structure having an end 118 that is configured to receive pivot pin 103 and be coupled to attachment bracket 100 between legs 114 and 116, and a distal end 120 that is configured to be coupled to outer plate 94 of reclining assembly 28. End 118 includes an aperture 113*d* (not shown) that aligns with the coaxial apertures 113*a*, 113*b*, and 113*c* of upper leg 114, lower leg 116, and horizontal leg 106 of floor mounting bracket 98, respectively. The alignment of apertures 113*a*, 113*b*, 113*c*, and 113*d* allows pivot pin 103 and be inserted through the apertures and rotatably couple swing arm 102 to attachment bracket 100. Distal end 120 includes apertures or other structures that facilitate the coupling of outer plate 94 of reclining assembly 28 to distal end 120. For example, distal end 120 may include apertures for receiving fasteners that extend through outer plate 94. Swing arm 102 also includes an extension or pin 122 that extends from distal end 120 toward vertical leg 108 of floor mounting bracket 98. Pin 122 is received within aperture 109 of vertical leg 108 and thereby helps to support distal end 120 of swing arm 102. According to one exemplary embodiment, swing arm 102 is configured to pivot or rotate approximately 90 degrees between a design position, in which swing arm 102 extends substantially rearward, and a swung position, in which swing arm 12 extends toward the outboard side of the vehicle.

Pivot pin 103 (e.g., shaft, pin, rod, etc.) is an elongated, generally cylindrical member that serves to pivotably couple swing arm 102 to attachment bracket 100 and define the pivot axis of swing arm 102. Pivot pin 103 extends through apertures 113*a*, 113*b*, 113*c*, and 113*d* in upper leg 114, lower leg 116, horizontal leg 106 of floor mounting bracket 98, and swing arm 102, respectively, and therefore defines axis 117 as the pivot axis of swing arm 102. Apertures 113*a*, 113*b* and 113*c* in upper leg 114, lower leg 116, and horizontal leg 106, respectively, generally serve to retain pivot pin 103, while aperture 113*d* of swing arm 102 allows swing arm 102 to pivot or rotate around pivot pin 103. According to an exemplary embodiment, axis 117 is slanted rearward of a perfectly horizontal axis by a between approximately 90 and 120 degrees, more preferably by between approximately 107 and 111 degrees, and more preferably by approximately 109 degrees. The rearward slant of axis 117 causes backrest 16 and seat base 18 to slant rearward when seat assembly 12 is in the I/E position, which allows backrest 16 and seat base 18 to fit within the space behind the backrests of the more forward seats (which also have a rearward slant).

Locking assembly 104 (e.g., retention device, latch, etc.) is an assembly of components that serve to releasably lock swing arm 102 in the swung (or inwardly rotated) position. According to various alternative and exemplary embodiments, locking assembly 104 may take one a variety of different configurations. According to another alternative embodiment, the locking assembly may serve to releasably lock the swing arm not only in the design position but also in the swung position. The locking assembly may be configured so that an occupant of the vehicle must actuate a handle or some other release mechanism to unlock the locking assembly when the swing arm is in the swung position, or the locking assembly may be configured to retain the swing arm in the swung position through the use of a resistance device (e.g. a ball/detent arrangement) that merely requires an occupant of the vehicle to apply just enough force to overcome the resistance of the resistance device to move the swing arm out of the swung position.

According to various alternatives and exemplary embodiments, swing assembly 30 may include a biasing device (e.g., a spring) that biases the backrest 16 and seat base 18 as a unit toward the I/E position. A damper may be provided for use in connection with the biasing device so that the backrest 16/seat base 18 units pivots into the I/E position in a smooth and controlled manner. According to other various alternative and exemplary embodiments, the biasing device and/or damper may not be provided as part of the swing assembly, but rather may be provided as part of one or more other components of the seat assembly, such as backrest frame 22, seat base frame 24, or one or more different components of linking system 25.

Referring now to FIG. 16, actuation system 21 is a system of components that allows an occupant of the vehicle to selectively move seat system 10 between its different positions. According to one exemplary embodiment, actuation system 21 includes handles or actuation devices 124, 126, 128, and 130, as well as various cables and linkages (not shown) that couple handles 124, 126, 128, and 130 to the particular devices they control.

Handles or actuation devices 124 and 126 are each operably coupled to release mechanism 62 of rear cushion latch 48, to front cushion latch 50, to floor latch assembly 27, and to reclining assembly 28 and generally allow the occupant to release or unlock each of these latches to permit the occupant to move seat assembly 12 into the I/E position. According to one exemplary embodiment, handle 124 is located on the outboard side of backrest 16 in a position that allows someone standing outside of the vehicle to actuate handle 124 and move seat assembly 12 into the I/E position. Handle 126, on the other hand, is located on the back of backrest 16 in a position that allows someone behind seat assembly 12 to actuate handle 126 and move seat assembly 12 into the I/E position. According to various alternative and exemplary embodiments, seating system 12 may include only one of handles 124 and 126, and such handle may be located in a position that is conveniently accessible by someone standing outside the vehicle and by someone behind seat assembly 12. According to other various alternative and exemplary embodiments, each of handles 124 and 126 may be located at one of a variety of different positions on seat assembly 12, such as on the seat base, on top of the backrest, etc.

Handle or actuation device 128 is operably coupled to reclining assembly 28 and generally allows the occupant to release or unlock reclining assembly 28 to permit the occupant to either adjust the reclining angle of backrest 16 or fold backrest 16 forward into the cargo or folded position. According to one exemplary embodiment, handle 128 is located on the outboard side of seat assembly 12 proximate outboard end 66 of torsion bar 54 in a position that is accessible to someone standing outside of the vehicle and to someone sitting on seat assembly 12. According to one exemplary embodiment, handle 128 is configured so that an occupant can actuate handle 128 and either adjust the recline angle of the backrest 16 or allow backrest 16 to pivot or rotate forward into the cargo position. To adjust the recline angle of backrest 16, the occupant actuates the handle, uses his body to adjust the recline angle of backrest 16 (e.g., by overcoming any bias of backrest 16 toward the cargo position), and then releases handle 128 to lock backrest 16 in the new position. To move backrest 16 into the cargo position, the occupant actuates handle 128 and allows the bias provided to backrest 16 (which may or may not be dampened) to pivot backrest 16 forward into the cargo position. According to various alternative and exemplary embodiments, handle 128 may be located at one of a variety of different positions on seat assembly 12, such as on the seat base, on the side of the backrest, on top of the backrest, etc. According to other various alternative and exemplary embodiments, handle 128 may be configured so that an occupant can actuate handle 128 in one way or direction to either adjust the reclining angle of the backrest or to move the backrest into the cargo position. According to still other various alternative and exemplary embodiments, two handles may be provided, one to adjust the reclining angle of the backrest and one to allow the backrest to be pivoted forward into the cargo position.

Handle or actuation device 130 is operably coupled to release mechanism 62 of rear cushion latch 48 and to front cushion latch 50 and generally allows the occupant to release or unlock each of these latches to permit the occupant to move seat base 18 into the stadium position or to return seat base 18 to the design position. According to one exemplary embodiment, handle 130 is located on the outboard side of seat base 18 near the front of seat base 18 in a position that allows someone standing outside of the vehicle to actuate handle 130 and move seat base 18 into the stadium position or return seat base 18 to the design position. According to one exemplary embodiment, handle 130 is configured so that an occupant can actuate handle 130 and either allow the seat base 18 to move into the stadium position (e.g., under any biasing forces that may be applied to seat base 18) or unlock seat base 18 from the stadium position and return it to the design position. According to various alternative and exemplary embodiments, handle 130 may be located at one of a variety of different positions on seat assembly 12, such as on the backrest, on or under the side of the seat base, in the middle of the front of the seat base, on a portion of the linking system, etc. According to other various alternative and exemplary embodiments, handle 130 may be configured so that an occupant can actuate handle 130 in one way or direction to either move the seat base into the stadium position or move the seat base out of the stadium position and into the design position. According to still other various alternative and exemplary embodiments, two handles may be provided, one to allow the seat base to move into the stadium position and one to allow the seat base to be moved out of the stadium position and into the design position.

According to various alternative and exemplary embodiments, each of the handles or occupant actuation devices may take one of a variety of different shapes, sizes, and configurations. For example, the handle may be ergonomically designed to fit within an occupant's fingers, it may be designed to correspond to or follow the contours of a portion of seat assembly 12, it may be rigid, it may be flexible (e.g., a strap or cord), and it may be made from one or more of a variety of different materials. According to other alternative and exemplary embodiments, each handle may be positioned in various locations on or around the seat. For example, one or more of the handles may be located below the seat base, on the back of the backrest, below the backrest and behind the seat base, on the side of the seat base, on a portion of the linking system, or at a variety of other locations. According to other alternative and exemplary embodiments, each handle may be mechanically coupled to the relevant components, may be electrically coupled to the relevant components, or may be operatively coupled to the relevant components in another manner (e.g., wirelessly, etc.). According to still other various alternative and exemplary embodiments, one or more of the handles may be configured to perform multiple functions and may replace one or more of the other handles. According to other various alternative and exemplary embodiments, the seat assembly may include additional handles to perform the same functions as one or more of the handles described above, or to perform other functions. For example, the seat assembly may include an additional handle (e.g. towel bar) that an occupant may use to control the adjustment of the seat in the forward and rearward direction.

As discussed above, seat assembly 12 can be moved between at least four different positions: (1) a design position in which seat assembly 12 is configured to receive a seated occupant (see FIG. 1); (2) a stadium position in which seat base 18 is rotated upward into a generally vertical position to rest against backrest 16 (see FIG. 2); (3) an ingress/egress (I/E) or access position in which seat base 18 is rotated upward to rest against backrest 16 and then the backrest 16 and seat base 18 are pivoted, as a single unit, approximately 90 degrees inward toward the center the vehicle (see FIG. 3); and (4) a cargo or folded position in which backrest 16 is pivoted forward into a generally horizontal position to rest against seat base 18 (see FIG. 4). It should be noted that the name given to each different position is not intended as a term of limitation. For example, although the position in which seat base 18 is rotated upward into a generally vertical position to rest against backrest 16 is referred to as the stadium position, this position of seat assembly 12 may also facilitate the storage of cargo within the vehicle.

To move seat assembly 12 from the design position to the stadium position, the occupant of the vehicle actuates handle 130 in the direction indicated by arrow A in FIG. 16. Handle 130 is operably coupled to rear cushion latch 48 and front cushion latch 50 so that upon actuation of handle 130, release mechanism 62 of rear cushion latch 48 releases arm 60 from the locked position and the second member of front cushion latch 50 opens the channel in the first member and permits support 17 to escape from the channel. With rear cushion latch 48 and front cushion latch 50 each released, seat base 18 is free to pivot upward about axis 65. Due to the bias of seat base 18, seat base 18 will begin to pivot upwardly without the assistance of the occupant when rear cushion latch 48 and front cushion latch 50 are released. Once seat base 18 pivots approximately 90 degrees into the stadium position, rear cushion latch 48 will lock seat base 18 in place. To return seat base 18 to the design position, the occupant actuates handle 130 in the direction indicated by arrow B, which releases rear cushion latch 48 and allows the occupant to pivot seat base 18 downward (against the bias of seat base 18) into the design position. When seat base 18 is returned to the design position, rear cushion latch 48 and front cushion latch 50 will again lock seat base 18 in position without any further action by the occupant. According to an alternative embodiment, front cushion latch 50 may need to be manually locked by the occupant of the seat to retain seat base 18 in position.

To move seat assembly 12 from the design position to the I/E or access position, the occupant of the vehicle actuates either handle 124 or 126 (depending on where the person is located). Handles 124 and 126 are each operably coupled (e.g., through various synchronization mechanisms and cables) to rear cushion latch 48, to front cushion latch 50, to floor latch assembly 27, and to reclining assembly 28. Upon the actuation of handle 124 or 126, reclining assembly 28 is released to allow backrest 16 to move to the full forward position, release mechanism 62 of rear cushion latch 48 releases arm 60 from the locked position, the second member of front cushion latch 50 opens the channel in the first member and permits support 17 to escape from the channel, and latch 86 of floor latch assembly 27 releases support 14. With rear cushion latch 48, front cushion latch 50, and floor latch assembly 27 each released and backrest 16 in the full forward recline position, seat base 18 is free to pivot upward about torsion bar 54 (axis 65) and the backrest 16/seat base 18 unit is free to pivot inward about axis 117 of swing assembly 30. Due to the bias of seat base 18, seat base 18 will begin to pivot upwardly without the assistance of the occupant when rear cushion latch 48 and front cushion latch 50 are released. When seat base 18 reaches its fully pivoted position, rear cushion latch 48 will lock seat base 18 in place with respect to torsion bar 54 (and backrest 16). The backrest 16/seat base 18 unit is also biased toward the inwardly rotated position by swing assembly 30, but the bias provided by swing assembly 30 is generally not strong enough to initiate rotation of the unit without assistance from the occupant. Accordingly, once seat base 18 begins to pivot upward (or once it has been locked in the stadium position), occupant rotates the backrest 16/seat base 18 unit into the inwardly rotated or swung position.

According to an alternative embodiment, the bias provided to the backrest/seat base unit by the swing assembly may be sufficient to rotate the unit inwardly without any assistance by the occupant. According to another alternative embodiment, the swing assembly may optionally include a lock or a resistance device (e.g., a ball and detent, etc.) that releasably retains the backrest/seat base unit in the inwardly rotated or swung position until the occupant releases the lock (e.g., by actuating one of handles 124, 126, 128, or 130 or another handle that may be provided) or applies enough force to overcome the resistance device. According to another alternative embodiment, for a seat assembly that is coupled to a track system that allows the fore/aft position of the seat assembly to be adjusted, handle 124 or 126 may also be operably coupled to a track latch or other release mechanisms of the track system so that the seat assembly can be returned (either by the occupant or by a biasing apparatus) to a fore/aft position that is either even with or forward of the fore/aft position of the seat toward which the seat assembly will swing (to allow for the appropriate clearance). According to another alternative embodiment, handle 124 or 126 may also be operably coupled to a track latch or other release mechanisms of the track system of the seat toward which the seat assembly will swing so that the seat can be moved back so that it is either even with or behind of the fore/aft position of the seat assembly (or swinging seat).

To return seat assembly 12 to the design position, the occupant releases the lock holding the backrest 16/seat base 18 unit in the inwardly rotated position, if there is one, and rotates the backrest 16/seat base 18 unit back to its original position. When the backrest 16/seat base 18 unit is returned to its original position floor latch assembly 27 will again lock linking system 25 (and therefore backrest 16 and seat base 18) in position without any further action by the occupant. Once the backrest 16/seat base 18 unit is back to its original position, the occupant actuates handle 130 in the direction indicated by arrow B, which releases rear cushion latch 48 and allows the occupant to push seat base 18 back down into the design position. When seat base 18 is returned to the design position, rear cushion latch 48 and front cushion latch 50 will again lock seat base 18 in position without any further action by the occupant. According to an alternative embodiment, when seat cushion 12 is returned to the design position, one or both of the floor latch assembly 27 and the front cushion latch 50 may need to be manually locked by the occupant of the seat to retain backrest 16 and seat base 18 in the design position.

To move seat assembly 12 into the cargo or folded position, the occupant of the vehicle actuates handle 128 in the direction indicated by arrow B and FIG. 16. Handle 128 is operably coupled to reclining assembly 28 so that upon actuation of handle 128 in the direction indicated by arrow B, reclining assembly 28 releases to permit backrest 16 to pivot forward about axis 65. Due to the bias provided to backrest 16 by reclining assembly 28, backrest 16 pivots forward into the cargo position without the assistance of the occupant upon the release of reclining assembly 28. According to various exemplary and alternative embodiments, reclining assembly 28 may or may not be configured to lock backrest 16 in the cargo position. To return backrest 16 to the design position, the occupant releases reclining assembly 28 (if reclining assembly 28 is configured to lock backrest 16 in the cargo position) and rotates backrest 16 back upward into the design position. When backrest 16 is returned to the design position, reclining assembly 28 will again lock backrest 16 in position without any further action by the occupant.

When seat assembly 12 is moved into the I/E position, seat base 18 will be located over the seat base of a more inwardly seat, and backrest 16 will be located proximate the edge of a more inwardly seat. With seat assembly 12 in this position, the surface of the vehicle floor that was previously covered by seat assembly 12 and the volume of space that was previously occupied by seat assembly 12, with the exception of the surface and volume backrest 16 continues to occupy proximate the more inwardly seat, is available for use by an occupant for storage purposes or for purposes of accessing a portion of the vehicle behind seat assembly 12. Unlike with other systems and arrangements, the surface of the vehicle floor that was previously covered by seat assembly 12 is substantially free of any supporting structures or mechanisms that would interfere with an occupant's ability to use the surface for storage or for access. The movement of seat assembly 12 into the I/E position allows the entry volume to be defined primarily by the vehicle door opening rather than by the vehicle door opening minus the volume of seat assembly 12.

According to one exemplary embodiment, seat assembly 12 is configured to move from the design position to the I/E position without any assistance from the occupant, except for the actuation of the actuation system (e.g., handle 124 or 126). With such a configuration, the actuation system and the linkage system are preferably synchronized so that seat assembly 12 moves from the design position to the I/E position as quickly as possible. According to an alternative embodiment, the actuation system and the linkage system may be configured so that the backrest 16 does not start swinging inwardly until seat base 18 completes its movement into the stadium position. According to other alternative and exemplary embodiments one or more of the handles may be operably coupled to one or more of the components of the seat assembly (e.g., through various synchronization devices and cables) to allow the occupant to move seat assembly directly to each of the different positions from each of the different positions.

According to an alternative embodiment, the seat assembly is configured in such a way that the seat base and backrest do not share the same pivot axis. Instead, the seat base is coupled to the backrest and pivots around a first axis that extends through the backrest. The backrest is coupled to a linking system and pivots around a second axis. Instead of the movement of the backrest and the seat base being independent of one another, with this embodiment, rotation of the backrest around the second axis would result in movement of the seat base. According to another alternative embodiment, the seat base and the backrest are not coupled to one another. Instead, the seat base and the backrest are separately coupled to the floor of the vehicle. To move the seat assembly into an I/E position, the seat base is pivoted forward to a position proximate the back of a more forward seat, and the backrest is pivoted inward toward the center of the vehicle as a separate unit from the seat base.

According to one exemplary embodiment illustrated in FIGS. 17A and 17B, seat system 10 makes up part of a larger seating system 1. For example, seating system 1 may be provided in a vehicle and may include a 40/20/40 split seat arrangement. The seat system 10 described above may be used for one or both of the 40% portions of the split seat arrangement, for just the 20% portion of the split seat arrangement, or for each portion of the split seat arrangement. According to another exemplary embodiment, seat system 10 may be used alone rather than in conjunction with other seats or seat arrangements. According to various alternative and exemplary embodiments, the seat system may be used as part of one of a variety of different seating arrangements. For example, the seat system may make up part of a 60/40 seating arrangement and may be used for the 40% portion, the 60% portion, or both the 40% and the 60% portions of the seating arrangement.

According to various exemplary and alternative embodiments, the seat system may be configured for use in one or more of a variety of different embodiments. For example, according to one alternative embodiment, the seat system may include tracks that allow for the fore/aft adjustment of the seat system. According to another alternative embodiment, the seat system may be configured to operate with different sized risers, with power systems allowing for the semi-automatic or full automatic control of different seat functions or operations, or with one or more of a variety of different structures or devices in one or more of a variety of different environments.

It is important to note that the term "seat" is intended to be a broad term and not a term of limitation. According to various alternative and exemplary embodiments, the seat system or arrangement may be used with any of a variety of vehicles, structures, assemblies, or arrangements and is not intended to be limited to use with automobiles, but may be used with any arrangement where an adjustable seat (e.g., selectively adjustable between a range of forward and rear positions, a design position, a cargo position, a stadium position, and/or an I/E position or configuration) is desirable. For example, the seating system may be used in airplanes, trains, buses, homes, offices, theaters, or anywhere a seated person may wish to adjust his or her seat or wish to move the seat between different positions or configurations. According to various other alternative and exemplary embodiments, the seating system may be coupled to the floor of a building, dwelling, or other type of structures, or one of a variety of other types of object or structures.

It is also important to note that the construction and arrangement of the elements of the seating system or arrangement as shown in the exemplary and alternative embodiments are illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, a variety of configurations may be provided for the different latches, the reclining assembly, and the swing assembly. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present inventions as expressed in any appended claim.

We claim:

1. A seat assembly for use in a vehicle, comprising:
 a seat frame assembly including a seat base and a backrest, wherein the seat base is pivotably coupled to the backrest such that the seat base and backrest are configured to move between a first position in which an occupant may sit and a second position where the seat base is foldable upward so as to place the seat base adjacent to the backrest;
 a first latch mechanism connected to the seat assembly and configured to selectively, pivotably lock the seat base relative to the backrest;
 a second latch mechanism coupled to the seat base and configured to selectively couple the seat base to the vehicle;

a swing assembly having a pivot axis aligned substantially vertically; and a reclining assembly coupled to the backrest and configured to control angular orientation of the backrest relative to the seat base, wherein the swing assembly is coupled to the backrest of the seat frame assembly, wherein the swing assembly is configured to be mounted on a vehicle floor such that the seat assembly is pivotable about the pivot axis between the second position and a third position.

2. The seat assembly according to claim 1, wherein the first latch mechanism is a rear cushion latch and the second latch mechanism is a front cushion latch configured to selectively couple the seat base to the vehicle floor.

3. The seat assembly according to claim 1, further comprising a locking assembly remotely coupled to the swing assembly, wherein the swing assembly comprises a swing arm coupled the backrest, and wherein the locking assembly is configured to releasably lock the swing arm in an inwardly rotated position when the seat assembly is in the third position.

4. The seat assembly according to claim 1, wherein the swing assembly comprises a swing arm coupled the backrest, a floor mounting bracket configured to be coupled to the vehicle floor, and a pivot configured such that the swing arm is pivotable relative to the floor mounting bracket.

5. The seat assembly according to claim 1, further comprising a handle located on the backrest for releasing the second latch mechanism and moving the seat assembly into the third position.

6. The seat assembly according to claim 1, wherein the third position is an easy entry position.

7. The seat assembly according to claim 1, wherein the seat base is pivotable about a rotatable axis such that the seat base is foldable upward so as to achieve the second position, and wherein the swing assembly is located below the rotatable axis in a vertical direction.

8. A seat assembly for use in a vehicle, comprising:

a seat frame assembly including a seat base and a backrest, wherein the seat base is pivotably coupled to the backrest such that the seat base and backrest are configured to move between a first position in which an occupant may sit and a second position where the seat base is foldable upward about a rotatable axis so as to place the seat base adjacent to the backrest;

a first latch mechanism connected to the seat assembly and configured to selectively, pivotably lock the seat base relative to the backrest;

a second latch mechanism coupled to the seat base and configured to selectively couple the seat base to the vehicle;

a swing assembly having a pivot axis aligned substantially vertically; and a reclining assembly coupled to the backrest and configured to control angular orientation of the backrest relative to the seat base, wherein the swing assembly is coupled to the backrest of the seat frame assembly, wherein the swing assembly is located below the rotatable axis in a vertical direction of the seat assembly, and wherein the swing assembly is configured to pivot about the pivot axis between the second position and a third position.

9. The seat assembly according to claim 8, wherein the first latch mechanism is a rear cushion latch and the second latch mechanism is a front cushion latch configured to selectively couple the seat base to a vehicle floor.

10. The seat assembly according to claim 8, further comprising a locking assembly remotely coupled to the swing assembly, wherein the swing assembly comprises a swing arm coupled the backrest, and wherein the locking assembly is configured to releasably lock the swing arm in an inwardly rotated position when the seat assembly is in the third position.

11. The seat assembly according to claim 8, wherein the swing assembly comprises a swing arm coupled the backrest, a floor mounting bracket configured to be coupled to a vehicle floor, and a pivot configured such that the swing arm is pivotable relative to the floor mounting bracket.

12. The seat assembly according to claim 8, further comprising a handle located on the backrest for releasing the second latch mechanism and moving the seat assembly into the third position.

13. The seat assembly according to claim 8, wherein the third position is an easy entry position.

14. The seat assembly according to claim 1, wherein the pivot axis of the swing assembly is located in front of the backrest by a non-zero distance.

15. The seat assembly according to claim 8, wherein the pivot axis of the swing assembly is located in front of the backrest by a non-zero distance.

16. A seat assembly, comprising:

a seat frame assembly including a seat base and a backrest;

a given latch mechanism coupled to the seat base and configured to selectively couple the seat base to a floor;

a swing assembly having a pivot axis aligned substantially vertically; and a reclining assembly coupled to the backrest and configured to control angular orientation of the backrest relative to the seat base, wherein the swing assembly is coupled to the backrest of the seat frame assembly, wherein the swing assembly is configured to pivot about the pivot axis between a first position and a second position.

17. The seat assembly according to claim 16, wherein the seat base is pivotably coupled to the backrest such that the seat base and backrest are configured to move between a third position in which an occupant may sit and the first position where the seat base is foldable upward so as to place the seat base adjacent to the backrest.

18. The seat assembly according to claim 16, wherein the swing assembly is configured to be mounted on the floor such that the seat assembly is pivotable about the pivot axis between the first position and the second position.

19. The seat assembly according to claim 16, wherein the seat base is foldable upward about a rotatable axis so as to place the seat base adjacent to the backrest, and wherein the swing assembly is located below the rotatable axis in a vertical direction of the seat assembly.

20. The seat assembly according to claim 16, wherein the pivot axis of the swing assembly is located in front of the backrest by a non-zero distance.

* * * * *